United States Patent
Barton et al.

[15] 3,687,943
[45] Aug. 29, 1972

[54] FLUORINATION OF UNSATURATED STEROIDS

[72] Inventors: Derek H. R. Barton, Department of Chemistry, Imperial College of Science and Technology, London, S.W.7, England; Robert H. Hesse, Research Institute for Medicine and Chemistry Inc., 49 Amherst St., Cambridge, Mass. 02142

[22] Filed: March 21, 1969

[21] Appl. No.: 809,389

Related U.S. Application Data

[63] Continuation-in-part of Ser. No. 667,000, Sept. 11, 1967, abandoned, and a continuation-in-part of Ser. No. 736,293, June 12, 1968, abandoned.

[52] U.S. Cl.......................................260/239.55 A, 260/397.2, 260/397.3, 260/397.4, 260/397.45, 260/239.55D

260/397.47
[51] Int. Cl.............................................C07c 173/00
[58] Field of Search............260/239.55, 397.2, 397.3, 397.4, 260/397.45, 397.47

*Primary Examiner*—Elbert L. Roberts
*Attorney*—Bacon & Thomas

[57] ABSTRACT

Electrophilic addition of fluorine to carbon-carbon multiple bonds which comprises reacting various unsaturated organic compounds in the liquid phase at low temperature with hypofluorites in which the fluoroxy group is covalently bonded to an inert electron-attracting group. A typical example of such a hypofluorite is trifluoromethyl hypofluorite. The reaction is generally applicable to a wide variety of aliphatic and aromatic organic compounds containing carbon-carbon multiple bonds.

8 Claims, No Drawings

FLUORINATION OF UNSATURATED STEROIDS

This application is a continuation-in-part of our applications Ser. No. 667,000 filed Sept. 11, 1967 and Ser. No. 736,293 filed June 12, 1968 both now abandoned.

This invention relates to a novel process for the introduction of fluorine into organic compounds.

The introduction of fluorine into organic structures is known to give valuable results in many fields. In the important field of steroids, introduction of fluorine, for example in the 9- or 6- positions has been found to enhance physiological activity and in general the fact that fluorine and hydrogen are similar in size but very different in electronegativity, means that replacement of hydrogen by fluorine will produce changed or potentiated biological activity.

Although methods have long been known and used for the controlled introduction of the halogens chlorine, bromine and iodine into unsaturated organic compounds, the introduction of fluorine has always proved difficult. Thus, although chlorine and bromine add readily to carbon-carbon double bonds, elemental fluorine usually reacts too indiscriminately and more complex reagents which have been proposed have been found frequently to be unsuccessful or inconvenient.

It is an object of the present invention to provide a convenient method for the addition of fluorine to unsaturated organic compounds.

We have found that hypofluorites in which the fluoroxy group is covalently bonded to an inert electron attracting group e.g. such organic hypofluorites as fluoroalkyl hypofluorites, or such inorganic hypofluorites such as pentafluorosulphur hypofluorites, react smoothly at low temperatures with unsaturated organic compounds to add at least one fluorine atom to the unsaturated linkage thereof. The mode of addition of the fluorine follows the rules generally obeyed by the other halogens in reacting with unsaturated compounds and the position of the carbon atom which receives the fluorine will depend, usually, upon the adjacent groupings. In general, a second substituent will be introduced at the same time or else internal rearrangement will take place.

According to the present invention, therefore, we provide a process for fluorinating unsaturated organic compounds wherein the unsaturated organic compound is reacted with a hypofluorite, the fluoroxy group of which is covalently bonded to an inert electron attracting group.

As indicated above, the hypofluorite may be organic or inorganic; in general the electron attracting group is preferably a fluoroalkyl group or a fluorosulphur group. Fluoro alkyl groups may carry hydrogen atoms or other halogen atoms but preferably carry at least two fluorine atoms per carbon atom, as, for example, in trifluoromethyl, perfluoropropyl, perfluoroisopropyl, perfluoro-t-butyl, monochloro-hexafluoropropyl or perfluoro-t-pentyl groups. The reagent may carry two fluoroxy groups as in 1,2-difluoroxy-tetrafluoroethane or 1,1-difluoroxy difluoro methane. The fluorosulphur group is preferably the pentafluorosulphur group.

The preferred reagent is trifluoromethyl hypofluorite.

The reaction is preferably carried out at reduced temperature e.g. in the range $-0°$ to $-100°C$, conveniently at about $-78°C$. On the other hand, deactivated substrates such as diphenylacetylene or bis-p-chlorophenyl-2,2-dichloroethylene react slowly at low temperatures but cleanly and rapidly at $-20°C$ to room temperature.

An inert solvent is preferably used, advantageously a fluoroalkane such as trichloromonofluoro-methane, dichlorotetrafluoroethane etc. The unsaturated organic compound to be fluorinated may be relatively insoluble in such a solvent and a further solvent may be advantageous, e.g. a chlorohydrocarbon such as carbon tetrachloride or methylene dichloride, a ketone such as acetone or methyl ethyl ketone or a cyclic or acyclic ether such as diethyl ether, tetrahydrofuran or dioxan or an alcohol such as methanol.

In many cases, acid is liberated in the reaction and addition of a base is often convenient, particularly where the substrate is acid-sensitive, and inorganic bases such as magnesium oxide, calcium oxide, sodium fluoride etc. are particularly effective bases. If temperatures above about $-10°C$ are used, however, these bases should be omitted where possible since they decompose the hypofluorite at such temperatures. Dried and activated molecular sieve material may also be used to take up unwanted acid.

Where the fluorinating reagent is a volatile liquid, as in the case of trifluoromethyl hypofluorite, it may conveniently be passed into the reaction solution in gaseous form rather than in liquid form. Nitrogen may be used, if desired, to dilute the gas and to sweep the medium free from excess reagent. The reaction may also be carried out under reduced pressure and the reagent distilled into the low-temperature medium. Alternatively, since hypofluorites can be stored as fairly stable concentrated solutions in fluorotrichloromethane such a solution of hypofluorite may be added to a solution of substrate in an acceptable solvent.

The hypofluorite reagent may be produced by reaction of elemental fluorine on certain oxygenated carbon-derivatives such as alcohols or carbon monoxide (in the presence of a silver fluoride catalyst). Perfluorinated carbonyl derivatives react with fluorine in the presence of a metal fluoride catalyst, preferably caesium fluoride, and for example, carbonyl difluoride yields trifluoromethoxy hypofluorite, perfluoroacyl fluorides such as perfluoroacetyl fluoride yield the corresponding perfluoroalkyl hypofluorite while perfluoroketones such as hexafluoroacetone yield the corresponding secondary perfluoroalkyl hypofluorites. Carbon monoxide yields trifluoromethoxy hypofluorite and methanol yields the same reagent. Other alcohols, e.g., perfluoro-t-butyl alcohol yield the corresponding hypofluorite also in the absence of a catalyst.

The conventional methods described above normally use a stoichiometric amount of fluorine or a moderate excess in order to minimize formation of partially-reacted by-products such as perfluorocarbonyl compounds, bis-perfluoroperoxides, bis-perfluorotrixodes and oligomers of perfluorocarbonyl compounds. Perfluorohydrocarbons are also commonly present. The use of excess fluorine reduces the yield of the above by products but the removal of residual fluorine by, for example, distillation, is troublesome. Naturally, elemental fluorine which reacts indiscriminately in fluorination reactions, cannot be allowed to remain in the reagent and, indeed, the presence of fluorine in the hypofluorite renders it susceptible to explosive decomposition.

We have now found that the desired hypofluorite reagents can be obtained in a satisfactory form by using less than the stoichiometric amount of fluorine so that virtually no unreacted fluorine remains after reaction. Although the yield is reduced and, in particular, the proportion of partially reacted impurities is increased, the initial reaction products can be effectively purified by simply washing the mixture with an aqueous medium, for example, water or an aqueous solution of a fluoride salt, for example, an alkali metal fluoride, e.g. sodium, potassium or caesium fluoride. The hypofluorite will commonly be in gaseous form, in which case the gas may be simply passed through the aqueous medium. Any water taken up by the hypofluorite during this washing step can readily be removed, where the hypofluorite is a gas, simply by passing the mixture through a low-temperature trap held, for example, at −80° to −20°C.

It is surprising that this simple and inexpensive procedure is capable of producing a hypofluorite reagent which can be used directly in the fluorination reaction according to the present invention. All reactive impurities appear to be removed and although certain impurities do remain, notably fluorocarbons and bis-fluorocarbon peroxides, they do not appear to enter into reaction with the unsaturated substrates to be fluorinated. It will be appreciated that bis-hydrocarbon peroxides, would be expected to react with typical unsaturated substrates and it is particularly surprising, therefore, that bis-fluorocarbon peroxides are unreactive, even at relatively high concentrations.

The foregoing method for the production of the hypofluorite reagent has the merit of being readily adaptable to large scale operation and, in particular, to continuous operation. The hypofluorite reagents are subject to catalytic decomposition on storage in the condensed state and the large scale storage of these material is preferably avoided. It is thus particularly desirable to be able to produce the reagent at the site of the fluorination process by a simple procedure and to lead the hypofluorite to the reactor without storage in the condensed state.

Thus, for example, a stream of fluorine and the oxygenated carbon derivative may be led into a reactor containing an appropriate catalyst and the effluent gaseous stream passed through water or an aqueous fluoride solution, if desired moving countercurrently to avoid accumultation of impurities, and then through a low temperature water trap. The continuously produced hypofluorite may be led directly to the reaction vessel for the fluorination reaction which may again be effected continuously with continuous removal of product from the reaction vessel. Alternatively, the reagent can be fed to a series of batch reactors. In many cases, excess gaseous hypofluorite and other unwanted volatiles can be subsequently removed by flushing through the initial fluorination product with an inert gas such as nitrogen, conveniently countercurrently.

While we do not wish to be bound by theoretical considerations, it is believed that in the hypofluorite, which may be represented as ROF, where R represents an inert electron attracting group, the group R withdraws electrons from the fluoroxy group to produce a partial positive charge on the fluorine atom. This is followed by nucleoelectrophilic attack on the II-electrons of the unsaturated bond in the organic compound to be fluorinated in the same way as attack by the positive chlorine or bromine in more conventional halogenating agents, and results in a positively charged intermediate which may react with anionic material such as the RO⁻ moiety or possibly eliminate H from an adjacent position whereby a new unsaturated linkage may be formed.

The reaction may be represented generally in the following way:

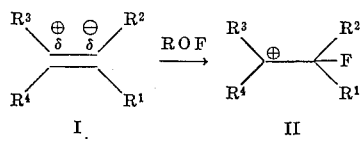

where $R^1$, $R^2$, $R^3$ and $R^4$ represent possible ligands attached to the reacting vinyl group. It will be noted that the fluorine atom adds at the more electronegative or nucleophilic carbon atom of the double bond to leave a full positive charge on the other carbon atom. The mode of addition is almost invariably cis.

The double bond may, of course, be present in both simple aliphatic structures and also in both aromatic and non-aromatic cyclic structures. The ligands $R^1$, $R^2$, $R^3$ and $R^4$ may therefore be, for example, hydrogen atoms, aliphatic groups such as alkyl or alkenyl groups e.g. having up to 18 carbon atoms, for example methyl, propyl, decyl, stearyl, allyl or oleyl groups; aromatic groups such as phenyl or naphthyl groups; saturated or unsaturated heterocyclic groups such as pyridyl, piperidyl, morpholinyl or piperazyl groups; O- or N-aliphatic, araliphatic or aromatic groups; $R^1$ and $R^4$ may join to form part of a mono or polycyclic ring structure, e.g. a steroid, a grisan such as griseofulvin, a phenyl group or a naphthyl group; or $R^1$ and $R^4$ may represent a carbon-carbon bond as in the acetylenes, the overall requirement being that there is a partial negative charge at the carbon atom adjacent to the ligands $R^1$ and $R^2$ or that such a partial negative charge is produced by proximity to the hypofluorite reagent.

In general the reaction will proceed more smoothly when the polarization of the double bond is most pronounced. $R^3$ may thus advantageously be an electronegative grouping such as an oxygen a nitrogen function, e.g. an O-acyl or N-acyl, O or N-alkyl, aralkyl or aryl substituent, for example an acetoxy, benzoxy, acetamido, benzamido, alkoxy or mono- or di-alkyl amino group. The nitrogen atom may form part of a heterocyclic ring e.g. a pyrrolidine or piperidine ring. The O- and N-acyl derivatives may, for example, be aliphatic, araliphatic or aromatic acyl derivatives, e.g. acetyl, propionyl, phenylacetyl or benzoyl derivatives. The corresponding O- and N-alkyl, aralkyl or aryl derivatives may, for example, be methyl, ethyl, propyl, butyl, amyl, benzyl, phenethyl or phenyl derivatives. $R^3$ may also be an aliphatic grouping in which a second vinyl group is in conjugation with the reacting double bond and such an electronegative substituent as in dienamines and dienolethers. In such circumstances as explained below in detail, the partial negative and positive charges may reside on either of the two vinyl groups depending on the substituents present.

R² may for example, advantageously be an aliphatic group carrying an electronegative substituent which is preferably capable of releasing electrons, for example, an oxygen or nitrogen function as defined for R³ or an oxo group or a halogen atom.

The ligands R¹, R², R³ and R⁴ may carry substituents, for example halogen atoms, e.g. fluorine, chlorine, bromine, or iodine atoms, mono- or polycyclic aromatic or heterocyclic groups, which may themselves be substituted, hydroxyl O-acyl, O-aliphatic, oxo, amino, N-acyl or N-aliphatic groups, again provided that a partial negative charge resides on the carbon atom adjacent to R¹ and R².

The ligand R³, where it is an oxygen or nitrogen function may, for example, form part of a heterocyclic ring containing the reacting double bond as in such compounds as 2,3-benzofuran and glycals.

The overall course of the reaction and the nature of the final products depends upon the nature of the ligands R¹, R², R³ and R⁴. In general, the reaction will follow the same course as when conventional halogenating reagents are used for introducing chlorine or bromine.

A number of embodiments of the process according to the invention are now described in greater detail.

1. Where the ligands R³ and/or R⁴, while being electronegative, are able to donate electrons, the intermediate cation II is sufficiently stable to capture an anion without eliminating any substituent atoms or groups. The captured anion will most frequently be RO⁻ but where other anions are present these will compete with RO⁻ to form mixtures. Where R is a fluorinated hydrocarbon group such as a trifluoromethyl group, the anion RO⁻ is capable of dissociating to eliminate F⁻. The fluorine anion may then compete with the CF₃O⁻ for the positive site of the cation II. This tendency is much less in the case of secondary hypofluorites; for instance, perfluoroisopropyl hypofluorite or tertiary hypofluorites; for instance, perfluorotertiaryamyl hypofluorite.

In this type of reaction, one of the ligands R³ and R⁴ may, for example, be a substituted amino or substituted hydroxyl group, for example a mono- or di-alkylamino or acylamino group or alkoxy or acyloxy group, as in enol ethers and esters and enamines, or an aromatic group such as phenyl or substituted phenyl group.

The donation of electrons by R³ and/or R⁴ will also facilitate elimination of the atom or group constituted by the added anion, by subsequent hydrolytic treatment. Thus, for example, in the case where R³ and/or R⁴ is an O-acyl, O-aliphatic, N-acyl or N-aliphatic group, elimination takes place very readily, accompanied by hydrolysis of the O- or N-substituent to yield α-fluoro-ketone.

The overall reaction can be expressed as follows:

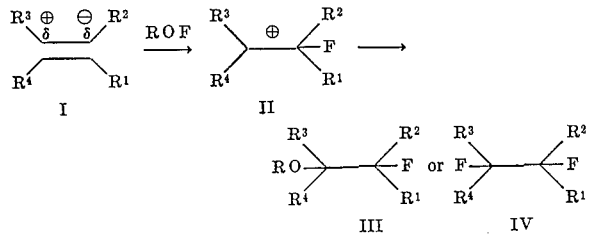

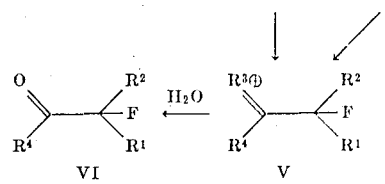

Thus, for example, 3β-acetoxy β²,³-cholestene reacts with CF₃OF to give 2α-fluoro-3ε-acetoxy-3ε-trifluoromethoxy-5-cholestane in admixture with 2α, 3ε-difluoro-3ε-acetoxy-5-cholestane. On hydrolysis with sodium hydroxide these both give 3α-fluorocholesterone. Similarly, bis-p-chlorophenyl-2,2-dichloro ethylene yields a mixture of the 2-fluoro-1-trifluoromethoxy adduct and the 1,2-difluoroadduct thereof (both of which compounds are important insecticides).

Where R is an aromatic group, the elimination reaction is more difficult but can normally be effected by treatment of the adduct with an alkaline substance such as an alkali metal hydroxide or alkoxide, in an alcoholic medium.

As indicated above, the reaction follows a closely similar course if R³ represents an allylic group carrying an electron-donating, electronegative group in conjugation with the two double bonds. This arrangement introduces the complication, however, that addition may take place at either or both of the vinyl groupings which are present, depending in part on the nature of the various substituents which are present. In the case, of dienamines and dienamides, where electron donation is particularly strong, the α-position is the most reactive so that, in effect, these species may actually be regarded as compounds of formula I in which R³ is N-aliphatic or N-acyl while R¹ or R² is an allylic group. On the other hand, in the case of dienol acylates, where electron donation is much weaker, the γ-position is most negative; so that these species can be regarded as compounds of formula I in which R³ is an allylic grouping carrying a conjugated acyloxy group. Substituents which donate electrons to an intermediate extent, such as dienol ethers, will often react at both the α- and the γ-position to give mixtures.

Considering the steroids, by way of illustration, in the 5α-steroid series, Δ²,³-enol esters, ethers, or enamines can be converted to 2α-fluoro steroids. In the 5β-steroid series, Δ³,⁴-enol esters, ethers or enamines may be converted to 4α-fluoro-steroids. Δ¹⁷,²⁰-enol esters are converted to 17-fluoro-20-keto compounds. Δ²⁰,²¹-enol esters are converted to 21-fluoro-20-keto compounds. Δ⁹,¹¹-enol esters are converted to 9α-fluoro and 9,12-difluoro-11-keto compounds. Δ¹⁶,¹⁷-enol esters may be converted into 16-fluoro-17-keto compounds. Δ¹⁴,¹⁵-enol esters derived from 15-keto compounds are converted to 14-fluoro-15-keto compounds.

Δ³,⁵-dienol and Δ¹,³,⁵-trienol esters are converted to 6α- and β-fluoro-Δ⁴-3-keto compounds; Δ³,⁵-enamines are converted to 4-fluoro-Δ⁴-3-keto compounds. The Δ⁸,⁹-Δ¹¹,¹²-enol esters derived from Δ⁹,¹¹-12-keto compounds are convertible to 8-fluoro-Δ⁹,¹¹-12-keto compounds. Δ¹⁴,¹⁵-Δ¹⁶,¹⁷-dienol esters derived from Δ¹⁵, ¹⁶-17-keto compounds may be converted to the corresponding 14-fluoro-Δ¹⁵,¹⁶-17-keto compound. Δ¹,³,⁵-trienol esters may be converted to the corresponding 6β-fluoro-Δ¹,⁴-compound.

The compounds in which R³ or R⁴ is an ether group (enol. ethers), may, in fact, be cyclic in structure, forming, for example, a pyran or furan ring as in 2,3 benzofuran (where F adds at the 2-position and F and OR add in competition at the 3-position to form a mixture) or in the glycals, where F adds at the 2-position and OR or F adds at the 1-position. This latter reaction may be represented as

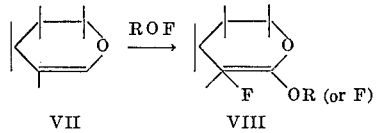

Treatment with a strong base, e.g. trityl lithium or sodium hydride, will eliminate the OR or F from the 1-position to yield a 2-fluoro-glycal which may be used as a glycosylating agent for the formation of fluorinated glycosides in synthetic organic chemistry. The 1-OR derivatives initially formed also serve as glycosylating agents, reacting readily with nucleophiles such as alcohols and amines. Thus, for example, reaction with methanol yields the methyl glycoside.

2. Where one or both of $R^1$ and $R^2$ is hydrogen or $R^4$ is a substituent joined to the reacting double bond by — CH—, elimination of hydrogen may take place from the carbonium ion II, before an anionic species such as $RO^-$ can be captured. In this case, a double bond will be spontaneously regenerated and the reaction may be represented as

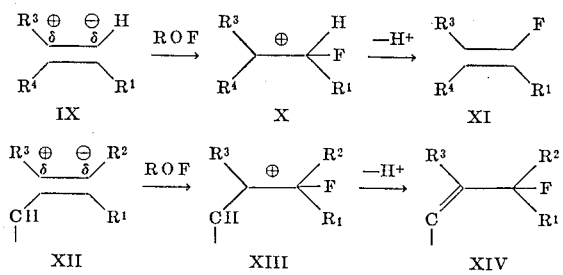

In each of these cases, if the resulting double bond is still activated it may react with a further molecule of ROF in the previously described way to yield a difluorinated or even trifluorinated product.

The elimination of the hydrogen atom will be facilitated by steric hindrance which inhibits the addition of anionic species but will itself be inhibited by electron donation by $R^3$ so that this reaction is more frequently observed when $R^3$ is a weakly electron donating group such as an acyloxy or ether group, or hydrogen or a non-activating grouping. Thus, for example, 9 (11)-ene-11-yl esters of 5β-steroids yields initially a 9α- fluoro carbonium ion having a positive charge at the 11-position; subsequent elimination of H from the 12-position (which represents the grouping $R^4$) yields an 11,12-double bond which reacts with a further molecule of ROF to give finally a 9,12-difluoro-11-one. The tendency to eliminate a hydrogen is often greater in the case of bulky hypofluorites; thus, the secondary hypofluorite perfluoroisopropyl hypofluorite gives more elimination than does $CF_3OF$. The tertiary hypofluorite, perfluorotertiaryamyl hypofluorite gives still more elimination of hydrogen.

Similarly, in the case of βγ-unsaturated ketones, elimination of hydrogen from the α-position of the carbonium ion initially formed yields a γ-fluoro-α-,β-unsaturated ketone.

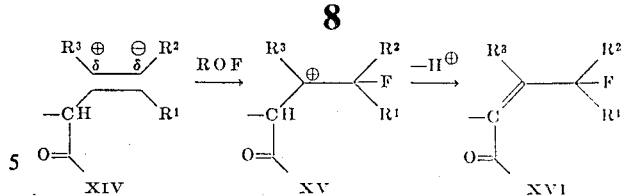

Considering the steroids by way of illustration, this sequence provides a route to a number of fluoro steroids. $\Delta^{5,10}$-3-keto compounds may be converted to 10-fluoro-$\Delta^4$-3-keto compounds in the 19-nor series. $\Delta^{5,6}$-3-keto compounds may be converted to 6-fluoro- $\Delta^4$-3-keto compounds.

Some olefinic substrates give rise to both elimination and addition. Stilbene, thus for instance, gives a major product 1,2-diphenyl-1-fluoro-2-trifluoromethoxy-ethane together with smaller amounts of 1,2-diphenyl-1,2-difluoroethane. These products arise, of course, from the capture by the intermediate fluoro carbonium ion of $RO^-$ and $F^-$ respectively. Careful analysis of the product mixture indicates that small amounts of 1,2-difuloro-1,2-diphenyl-1-trifluoromethoxy-ethane are also present. This arises from the addition of $F^+$ and $RO^-$ to an intermediate fluoro stilbene which itself arises in turn from the elimination of $H^+$ from the intermediate fluoro carbonium ion II described above.

As indicated above an RO residue such as $OCF_3$ may readily be eliminated, e.g., on treatment with acid or alkali, to regenerate an unsaturated linkage and the ease of elimination of the RO moiety will in general depend on the adjacent substituents. Where the group RO is attached to a carbon atom having an electron-donating atom such as oxygen or nitrogen, or is in the β-position relative to an unsaturated grouping such as carbonyl, it may be eliminated by treatment with acids or bases under mild conditions, or by pyrolysis or even spontaneously. If RO is attached to a carbon atom carrying an ether or amine group, elimination may often be effected simply by shaking with a mild alkali such as an alkali metal bicarbonate. Where the electron donating group is an acyloxy group, RO attachment is more stable but for example, RO can be usually eliminated by heating with alkali metal bicarbonate, e.g. in alkanol such as methanol or ethanol, or by room temperature treatment with stronger alkali such as 1 percent alkali metal hydroxide in an alkanol solvent, or treatment with acid such as hydrochloric or hydrobromic acid in solvent media such as halogenated hydrocarbons containing if desired, carboxylic acids such as acetic acid and/or alkanols such as ethanol. Where a second fluorine atom has added in competition with RO, this can usually be eliminated by treatment with acid or alkali in the same way as RO and, for example, 3-acetoxy-20-keto-pregn-5-ene on reaction with $CF_3OF$ yields a mixture of 3β-actoxy-20-keto-5-trifluoromethoxy- 6α-fluoro-pregnane and the corresponding 5α,6β-difluoride both of which can be converted to 3-keto-derivatives on treatment with alkali or acid yield 6α-fluoroprogesterone.

3. Where one or both of $R^1$ and $R^2$ is joined to the reacting double bond by a carbon atom linked to an electronegative, electron-releasing atom or group, for example, an oxygen or nitrogen function such as an O- or N-acyl, -aliphatic, -araliphatic or aromatic group or an oxo or halogen substituent, more especially a hydroxyl or oxo group, a smooth reaction takes place as follows, as illustrated by an α,β-unsaturated ketone:

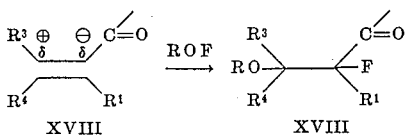

Where there is an adjacent eliminatable hydrogen, ROH may be eliminated; a mixture of the initial adduct ($\alpha$-fluoro-$\beta$-OR-aldehyde or ketone) and the elimination product ($\alpha$-fluoro-$\alpha,\beta$-unsaturated aldehyde or ketone) is usually obtained initially but the elimination can be completed by treatment with acid or alkali. Thus, for example, testosterone acetate yields, after hydrolysis, 4-fluoro-testosterone.

Where $R^1$ or $R^2$ carries a hydroxyl or acyloxy group rather than an oxo group, the initial product will be the corresponding $\alpha$-fluoro-$\beta$-OR-alcohol or ester. Hydrolysis of the acyloxy group, where necessary, and oxidation and elimination of OR yields an $\alpha$-fluoro-$\alpha,\beta$-unsaturated aldehyde or ketone. Thus, for example, $\Delta^{9,11}$-12-hydroxy or acyloxy-steroids yield 11-fluoro-9-OR-12-hydroxy or acyloxy steroids while 3$\beta$-acyloxy-$\Delta^{4,5}$-steroids yield initially 4-fluoro-5-OR-3$\beta$-acyloxy-steroids.

4. Where $R^3$ is electronegative but $R^4$ is a substituent carrying a nucleophilic group, e.g. an oxygen or nitrogen function, such as hydroxyl or amino group, the nucleophilic group will react with the positively charged carbon atom in the initial product of formula II to give a ring structure, such as an epoxide, aziridine, furan, pyran, pyrrolidine or piperidine.

Thus, for example, addition of ROF to 16-methylene prednisone 21-acetate yields the corresponding 16$\beta$-fluoromethyl-16,17-epoxy compound by initial addition of F to the methyl group followed by elimination of hydrogen from the 17$\alpha$-hydroxy group to form a 16,17-epoxide.

5. Where $R^4$ is joined to the reacting double bond by a carbon atom carrying a weakly nucleophilic group such as a carbon nucleophile or halogen, this group will be attracted by the positive charge as in 4 above but migration rather than ring formation takes place to yield a rearranged isomer of the carbonium ion II which may then eliminate hydrogen or capture an anion as described above.

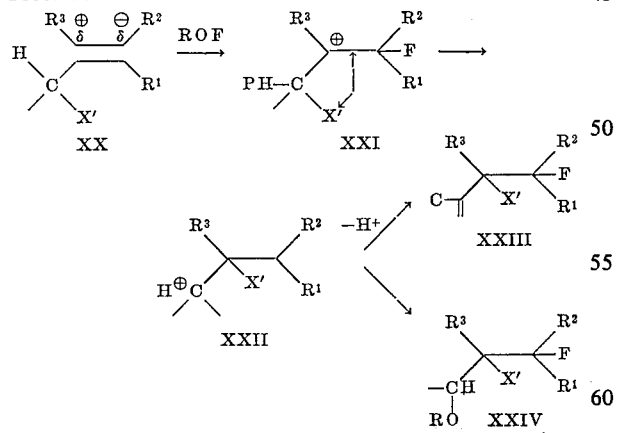

(where X' represents the aforesaid weakly nucleophilic grouping).

Where the carbonium anion is stabilized, e.g. by electron donation by $R^3$, the capture of RO$^-$ will predominate. By way of illustration, addition of ROF to $\Delta^{9,11}$-progesterone bismethylene dioxide yields the corresponding 11$\alpha$-fluoro-9$\beta$-methyl-3-hydroxy-1,3,5(10)-triene, F adding initially at the 11-position and the positive charge at the 9-position causing migration of the 10-methyl group to the 9$\alpha$- position and elimination of hydrogen from the 1-position to create a phenolic A-ring.

6. Where $R^1$ and $R^4$ join to form an aromatic ring structure (so that the reacting double bond is actually an aromatic double bond) the initial addition of F is at the most nucleophilic position as is found with more conventional halogenating agents.

In general the reaction will proceed better with aromatic ring compounds, e.g. benzene derivatives, carrying one or more electron releasing substituents such as hydroxyl, ether, acylamido groups etc., than those carrying electron-withdrawing groups such as nitro groups, which react only slowly. Other aromatic ring structures which may be fluorinated include, for example, condensed polycyclic, carbocyclic aromatic compounds, for instance naphthalenes and substituted naphthalenes, anthracenes and substituted anthracenes, phenanthrenes, and acenaphthenes. Hetero-cyclic aromatic compounds are also suitable starting materials for the purposes of this invention. Such hetero-cycles may be monocyclic or polycyclic and bear one or more hetero-atoms such as oxygen, nitrogen or sulphur, for instance, furans, pyrroles, and thiophenes, benzfurans, indoles and benzthiophenes, pyrimidines and imidazoles.

Aromatic rings activated by electron-releasing substituents will be fluorinated in the ortho or para position to the activating groups by hypofluorite reagents. Similarly, rings somewhat deactivated by electron-withdrawing substituents will be fluorinated in a portion meta to such substituents and a prediction as to whether ortho, para or meta fluorination will result from reaction with a hypofluorite can be made on the basis of the conventional chemistry. Thus, those activated aromatics which tend to react in the ortho position with bromine, chlorine and nitric acid will usually react in the ortho position with a hypofluorite; the same holds true for para substitution. We have noticed that the tendency of hypofluorites to add rather than substitute at aromatic double bonds is somewhat greater than that observed for bromine but is markedly less than that observed for fluorine. Addition to an aromatic double bond versus substitution appears to be favored in those aromatic compounds which are activated and thus extremely reactive. This again is in keeping with what is known regarding conventional electrophilic agents. The adducts of hypofluorites with aromatic compounds like those with activated olefins are susceptible to ready hydrolysis. In the case of adducts of activated aromatics, acid or alkaline hydrolysis produces fluorinated aromatic compounds.

The reaction of ROF with a ring-activated aromatic compound is illustrated by the following equation:

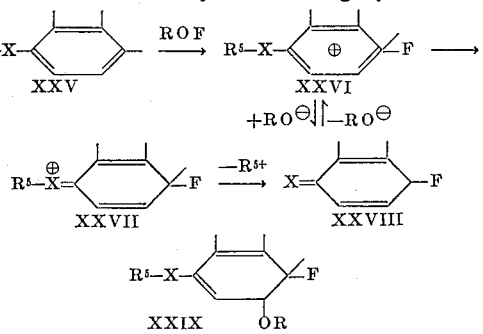

(where $R^5X$ represents an activating group such as hydroxyl, O-acyl, O-aliphatic group). The carbonium ion initially formed may either capture a nucleophile such as $RO^-$ or rearrange in the neighborhood of the activating group, usually with elimination from the activating group to allow a dienone or dienimine structure. Where a nucleophile is captured, as shown in the above equation, the product contains an activated vinyl group capable of reacting further with ROF, to form a bis-fluorinated adduct. Naturally, if this further reaction is to take place it must proceed more rapidly than the elimination of $RO^-$ from compound XXIX (followed by rearrangement to form dienone or dienimine) shown in the above equation. Where the initial product is highly activated, the second addition of ROF will be rapid and for example, in the case of N-acetyl α-naphthylamine, the initial product

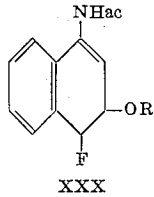

XXX is a highly reactive enamine which rapidly adds F and a further anionic species. Where the reaction was carried out in the presence of ethanol, F and $C_2H_5O$ added. Subsequent treatment with a base eliminates the nucleophile groupings from the α- and γ-carbon atoms to yield N-acetyl-2,4-difluoronaphthalene. On the other hand, N-acetyl-β-naphthylamine simply adds F at the α-position and an anionic species at the β-position which on subsequent elimination of RO gives N-acetylα-fluoro-β-naphthylamine.

Where elimination of RO is slow, so that rearrangement to a dienone or dienimine species does not occur immediately, as in the reaction of ROF with naphthalene, the initial product will react with a second molecule of ROF before elimination takes place to give a bis-adduct which on treatment with a base will yield α,γ-difluoro-naphthalene. In fact, where the reagent is $CF_3OF$, competition of $F^-$ with $RO^-$ gives as initial product a high proportion of 1,2,3,4-tetrafluoro-1,2,3,4-tetrahydronaphthalene.

Where rearrangement to a dienone or dienimine structure does take place, the nature of the final product depends on the possibility of further rearrangement. If the ligand adjacent to the fluorine atom ($R^1$ in formula II) is hydrogen, the diene structure can rearrange tautomerically to an aromatic structure as follows:

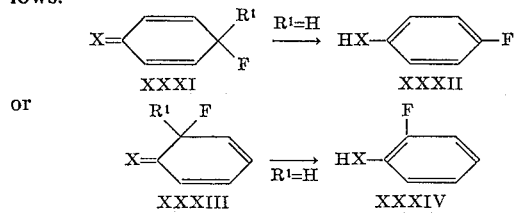

This reaction is illustrated by the fluorination of phenols such as salicyclic acid and salicylamide and of N-acetyl-β-naphthylamine, where fluorine is added at the expected ortho or para positions relative to the activating groups, and although elimination would be expected to give initially a dienone or dienimine form, tautomerization regenerates a monofluorinated aromatic ring.

On the other hand, where $R^1$ is a non-eliminatable substituent such as an alkyl group, or forms part of a cyclic structure, the dienone or dienimine form will be the final product. Thus, for example, 2,6-dimethylphenol yields 2,6-dimethyl-6fluorocyclohexa-2,4-dienone (in dimeric form) while oestrone methyl ether yields 19-nor-10β-fluoro-3,17-diketo-androsta-1,4-diene.

Where $R^1$ is hydrogen but the activating group $R^5X$ does not readily eliminate $R^5$, $R^1$ may be eliminated to regenerate an aromatic ring.

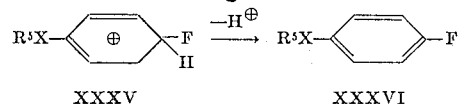

XXXV        XXXVI

Thus griseofulvin reacts with ROF to form the 5-fluoroderivative thereof.

7. Where $R^1$ and $R^4$ together represent a carbon-carbon bond, as in the acetylenes, the reagent ROF appears to react first to produce an olefin which, however, will normally react further to add further F and either RO or F. The acetylenic linkage can be regarded as deactivated so that the initial olefin reacts more rapidly than the acetylene and cannot readily be detected. In the case of 1,2-diphenylacetylene, the product is 1,2-diphenyl-1,1,2-trifluoro-2-trifluoromethoxyethane.

The new reagents are thus capable of introducing fluorine into a wide variety of commonly occurring unsaturated organic groupings and furthermore, do not react with hydrocarbon, keto, ether, ester or alcohol groups which may be present. As compared with the previously proposed fluorinating agent perchloryl fluoride, they react more readily with relatively inactivated unsaturated compounds, e.g. enol esters, and do not produce the chlorinated by-products which are frequently produced by $ClO_3.F$. The latter reagent will not, in fact, react at all with unactivated olefins or deactivated olefins such as α,β-unsaturated ketones. It should also be mentioned that $ClO_3.F$ represents an explosive hazard whereas this is not the case with the hypofluorites.

Although the principal forms of the present method have been illustrated with reference to the steroids, it will be appreciated that the invention is applicable to a wide range of organic compounds. Apart from steroids, other cyclic compounds such as the alkaloids and simple acyclic olefins can all be fluorinated by the present method.

Where unsaturated steroids are used as starting material, these may, for example, be in the androstane, pregnane, oestrane, cholestane or spirostane series. In view of the selectivity of the new reagents, keto groups may be present, for example, in the 3-, 11-, 17- and/or 20-positions, hydroxyl, ether or acyloxy groups may be present, for example, in the 3-, 6-, 11-, 21- or 17-positions, halogen atoms may be present for example at the 6-, 9- and/or 16-positions, hydrocarbon groups may be present for example at the 6,16- and/or 17-positions.

In general, where the starting materials contain aliphatic groups in side chains, e.g. alkyl, aliphatic acyl, alkoxy groups etc., there are one to eight carbon atoms, preferably one to five carbon atoms, in the aliphatic moiety.

The following Examples are given by way of illustration only; unless otherwise stated, previously known compounds were identified by melting point and IR spectra:

EXAMPLE 1

Fluorination of 3-acetoxy-$\Delta^{2,3}$-cholestene with trifluoromethyl hypofluorite.

A solution of the title steroid (2 g.) in $CFCl_3$ (350 ml.) containing calcium oxide (1 g.) was treated at $-78°$ with a slow stream of $CF_3OF$. Excess oxidant was removed by sweeping with nitrogen. The solution was then filtered and the precipitate washed with methylene chloride. The filtrate was washed with aqueous sodium bicarbonate, concentrated to small bulk, and chromatographed on neutral alumina. The first compound eluted was 2$\alpha$-fluoro-3$\epsilon$-acetoxy 3$\epsilon$-trifluoromethoxy-5-cholestane, m.p. $108°-110°$, $\alpha_D +26°$, $\nu_{max}^{KBr}$ 1760 and 1752 cm.$^{-1}$.

Anal. Calcd.: C, 67.64; H, 9.08; F, 14.17%. Found: C, 67.68; H, 9.10; F, 13.70%.

The second compound eluted was 2$\alpha$. 3$\epsilon$-difluoro-3 $\epsilon$-acetoxy-5$\alpha$-cholestane, m.p. $114-115°$, $\nu_{max}^{KBr}$ 1770 and 1750 cm.$^{-1}$. the final product eluted was 2$\alpha$-fluorocholestanone.

Either of the adducts above, on treatment with 1 percent sodium hydroxide in methanol, gave 2$\alpha$-fluorocholestanone. Treatment of the total product mixture obtained from the reaction before chromatography with sodium hydroxide in methanol gave as a single product 2$\alpha$-fluorocholestanone.

In a similar fashion, 3,17$\beta$-diacetoxyandrost-2,3-ene, on reaction with trifluoromethyl hypofluorite followed by hydrolysis with sodium hydroxide in methanol, gives 2$\alpha$-fluoro-7$\beta$-hydroxy-5$\alpha$-androstan-3-one.

3,20-Diacetoxypregn-2,3-ene gives 2$\alpha$-fluoro-20-hydroxy-5$\alpha$-pregnan-3-one.

3$\beta$,20-diacetoxy-5$\alpha$-pregn-20,21-ene gives 3$\beta$-hydroxy-21-fluoro-5$\alpha$-pregnan-20-one. (On reaction with chromium trioxide in acetic acid, this compound is converted to the known 21-fluoroprogesterone.)

3$\beta$,20-diacetoxy-5$\alpha$-pregn-17,20-ene gives 3$\beta$-hydroxy-17$\alpha$-fluoro-5$\alpha$-pregnan-20-one.

3$\beta$,17-diacetoxy-5$\alpha$-androst-16,17-ene gives 3$\beta$-hydroxy-16-fluoro-5$\alpha$-androstan-17-one.

EXAMPLE 2

Fluorination of 3-methoxy-$\Delta^{2,3}$-cholestene with trifluoromethyl hypofluorite A solution of the title steroid (300 mg.) in $CFCl_3$ (200 ml.) containing calcium oxide (0.6 g.) was treated with an excess of $CF_3OF$ as in Example 1. After filtration and washing of the precipitate with methylene chloride the total crude product was shaken with saturated sodium bicarbonate, dried over anhydrous sodium sulphate, and evaporated to small bulk. Crystallization from hexane gave 2$\alpha$-fluorocholestanone in 70 percent yield.

EXAMPLE 3

Fluorination of cholestan-3-one pyrrolidine enamine with trifluoromethyl hypofluorite A solution of the title steroid (1 g.) in $CFCl_3$ (200 ml.) containing calcium oxide (200 mg.) was treated with $CF_3OF$ as in Example 1. After filtration, washing of the precipitate with methylene chloride, washing the combined filtrates with aqueous sodium bicarbonate, drying and concentrating in vacuo the crude product was taken up in benzene/light petroleum (1:1) and filtered through magnesium silicate. The filtrate was evaporated to dryness and the residue crystallized from hexane to afford 2$\alpha$-fluorocholestanone.

EXAMPLE 4

Reaction of 3-acetoxy-$\Delta^{2,3}$-cholestene with 2-fluoroxy perfluoropropane A solution of the title steroid (645 mg.) in dry $CFCl_3$ (65 ml.) containing calcium oxide (350 mg.) was treated at $-78°$ with an excess of 2-fluoroxy perfluoropropane. After one hour, the solvent was removed at low temperature. After filtration, washing of the precipitate with methylene chloride, washing the combined filtrates with aqueous sodium bicarbonate, drying and concentrating in vacuo the residue was chromatographed on alumina. The first compound eluted was 2$\alpha$-fluoro-3$\epsilon$-perfluoroisopropoxy-3$\epsilon$-acetoxycholestane, m.p. $77°-78°$, $\nu_{max}^{KBr}$ 1760, 1200, 1035, 980, and 736 cm.$^{-1}$ Anal. Calcd. for $C_{23}H_{49}O_3F_8$: C, 60.74; H, 7.65; F, 24.02%. Found: C, 60.94; H, 7.51; F, 24.33%.

This compound, on hydrolysis with sodium hydroxide in methanol, afforded 2$\alpha$-fluorocholestanone.

The second compound eluted from the column was 2$\alpha$-fluorocholestanone.

EXAMPLE 5

Fluorination of 3-methoxy-17-acetoxy-$\Delta^{3,5}$-androstadiene with trifluoromethyl hypofluorite A solution of the title steroid (1.72 g.) in dry $CFCl_3$ (300 ml.) containing calcium (0.5 g.) was treated at $-78°$ with 1 mole of $CF_3OF$. After one hour at this temperature, the reaction mixture was filtered, the precipitate washed with methylene chloride, the combined filtrates washed with aqueous sodium bicarbonate, dried and concentrated in vacuo and the residue chromatographed on alumina. The products obtained were, in order of elution, 4-fluorotestosterone acetate, 6$\beta$-fluorotestosterone acetate, and a mixture of 6$\alpha$-fluorotestosterone acetate and testosterone acetate.

EXAMPLE 6

Fluorination of 3,17-diacetoxy-$\Delta^{3,5}$-androstadiene with trifluoromethyl hypofluorite The title steroid (940 mg.) in $CFCl_3$ (105 ml.) containing calcium oxide was treated with $CF_3OF$ (1.5 equivalents). After filtration, washing of the precipitate with methylene chloride, washing the combined filtrates with aqueous sodium bicarbonate, drying and concentrating in vacuo, the product mixture was chromatographed on alumina to afford the adduct 5$\epsilon$-fluoro-6$\beta$-fluoro-$\Delta^{3,4}$-androstene-3,17-diol diacetate, m.p. $173°-177°$, $\nu_{max}^{KBr}$ 1745 and 1760 cm.$^{-1}$ Anal. Calcd. for $C_{23}H_{32}F_2O_4$: C, 67.32; H, 7.80; F, 9.27% Found: C, 67.2; H, 7.77; F, 9.12%.

Further elution gave 6$\beta$-fluorotestosterone acetate followed by 6$\alpha$-fluorotestosterone acetate. Work-up of the crude reaction mixture described above by hydrolysis with sodium hydroxide in methanol (1 percent), followed by reacetylation and equilibration with hydrogen chloride in chloroform gave as a major product 6$\alpha$-fluorotestosterone acetate.

EXAMPLE 7

Fluorination of 3β,20-diacetoxy-5α-preg-20,21-ene with trifluoromethyl hypofluorite The title steroid (400 mg.) in CFCl$_3$ (25 cc.) containing calcium oxide (100 mg.) was treated at −78° with an excess of CF$_3$OF. After filtration, washing of the precipitate with methylene chloride, washing the combined filtrates with aqueous sodium bicarbonate, drying and concentrating in vacuo, the crude product was hydrolyzed with sodium hydroxide in methanol (1 percent) to afford 3β-acetoxy-21-fluoro-5α-pregnane-20-one, a new compound.

EXAMPLE 8

Fluorination of 3α,11,20β-triacetoxy-5β-preg-9,11-ene with trifluoromethyl hypofluorite The title steroid (460 mg.) dissolved in CFCl$_3$ (160 cc.) and methylene chloride (80 cc.) containing calcium oxide (200 mg.) was treated with trifluoromethyl hypofluorite (two portions of 36 cc.). After two hours at −78°, the excess fluorinating agent was removed with nitrogen. After filtration, washing of the precipitate with methylene chloride, washing the combined filtrates with aqueous sodium bicarbonate, drying and concentrating in vacuo, the crude product was treated for one hour with sodium hydroxide in methanol (30 cc., 1 percent) and diluted with water and saturated salt. The crude product was removed by filtration, chromatographed on alumina, and recrystallized from ether to give 3α,20β-dihydroxy-9α-fluoro-5β-pregnan-11-one 20-acetate, which was hydrolyzed with sodium hydroxide in methanol and oxidized with chromium trioxide in acetone to give 9α-fluoro-5β-pregnan-3,11,20-trione.

The mother liquors obtained from the crystallization of the monoacetate above were saponified with sodium hydroxide. The resulting product was oxidized with chromium trioxide in acetone to afford 9,12-difluoro-7β-pregnan-3,11,20-trione. In a similar fashion, the Δ$^{9,11}$-enol acetate of prednisone bismethylene dioxide (formed by reaction of prednisone bismethylene dioxide with triphenylmethyl sodium and acetyl chloride or acetic anhydride) gave a mixture of 9α-fluoroprednisone bismethylene dioxide and 9α,12-difluoroprednisone bismethylene dioxide. M.p.279°−280°[α]$^D$+25° Similarly, 16β-methylprednisone bismethylene dioxide gave a mixture of 9α-fluoro-16β-methylprednisone bismethylene dioxide and 9α,12-difluoro-16β-methylprednisone bismethylene dioxide. All these compounds are new.

The yield of 9α,12-difluoro steroid is higher when the hypofluorite used is perfluoroisopropyl hypofluorite and may be increased still further by using perfluorotertiarypentyl hypofluorite.

EXAMPLE 9

Fluorination of 3β-acetoxy-Δ$^5$-pregnen-20-one with trifluoromethyl hypofluorite The title steroid (410 mg.) in CFCl$_3$ (60 cc.) containing calcium oxide (1.2 g.) was treated with an excess of CF$_3$OF. After filtration, washing of the precipitate with methylene chloride, washing the combined filtrates with aqueous sodium bicarbonate, drying and concentrating in vacuo, the crude product was chromatographed on alumina to afford, after crystallization from ether, the adduct 3β-acetoxy-5α-trifluoromethoxy-6α-fluoropregnan-20-one, m.p. 175°–182°, $v_{max.}^{KBr}$ 1740 and 1720 cm$^{-1}$.

Anal. Calcd. for C$_{24}$H$_{34}$O$_4$F$_4$: C, 62.32; H, 7.41; F, 16.43%

Found: C, 62.26; H, 7.32; F, 16.38%.

This adduct on saponification with sodium hydroxide, followed by oxidation with chromium trioxide and refluxing with potassium acetate in methanol, gave the known 6α-fluoroprogesterone.

EXAMPLE 10

Reaction of testosterone acetate with trifluoromethyl hypofluorite

The title steroid (1.65 g.) dissolved in dry CFCl$_3$ (300 ml.) containing calcium oxide (0.5 g.) was treated at −78° with CF$_3$OF until starting material was no longer evident. After filtration, washing of the precipitate with methylene chloride, washing the combined filtrates with aqueous sodium bicarbonate, drying and concentrating in vacuo, the crude product was chromatographed on alumina to afford 4-fluorotestosterone acetate.

EXAMPLE 11

Fluorination of the pyrrolidine enamine from testosterone acetate with trifluoromethyl hypofluorite The title steroid (1.8 g.) in CFCl$_3$ (300 cc.) containing calcium oxide (0.5 g.) was treated with CF$_3$OF (210 cc.) for one hour. After filtration, washing of the precipitate with methylene chloride, washing the combined filtrates with aqueous sodium bicarbonate, drying and concentrating in vacuo the residue was chromatographed on alumina. The first material eluted was the major product, 4-fluorotestosterone acetate, followed by smaller amounts of polar impurities.

EXAMPLE 12

Fluorination of estrone methyl ether with trifluoromethyl hypofluorite

The title steroid (1.5 g.) dissolved in CFCl$_3$ (300 cc.) and CHCl$_3$ (80 cc.) containing calcium oxide (0.5 g.) was treated with CF$_3$OF (260 cc.). After filtration, washing of the precipitate with methylene chloride, washing the combined filtrates with aqueous sodium bicarbonate, drying and concentrating in vacuo the reaction mixture was evaporated to small bulk, and the product, 19-nor-10β-fluoro-3,17-diketoandrosta-1,4-diene, was isolated. A similar result was obtained using estrone acetate as starting material.

EXAMPLE 13

Fluorination of Δ$^{5,6}$-androstene-3,17-dione with trifluoromethyl hypofluorite The title steroid dissolved in Freon containing calcium oxide was treated with CF$_3$OF. After filtration, washing of the precipitate with methylene chloride, washing the combined filtrates with aqueous sodium bicarbonate, drying and concentrating in vacuo 6-fluoro-Δ$^4$-androstene-3,17-dione was obtained.

EXAMPLE 14

Fluorination of 16-Methylene Prednisone-21-Acetate

A solution of the title steroid (1 g.) in chloroform (100 cc.) containing calcium oxide (0.3 g.) and maintained at −78° was treated with $CF_3OF$ (150 cc.). Following the work-up procedure of Example 1 chromatography on aluminum afforded as the major product 16-fluoromethyl-16,17-epoxy-prednisone-21-acetate, melting point 176°–7° $[\alpha]^D + 187°$. keto-5α-25 R-spirostane was obtained.

EXAMPLE 15

Fluorination of Δ⁴-androsten-3β,17β-diol diacetate

A solution of the title compound (2.07 g.) in $CFCl_3$ (250 ml.) was treated with $CF_3OF$ (230 ml.) in the presence of calcium oxide (0.5 g.) at −78° for 2 hours. After filtration, washing of the precipitate with methylene chloride, washing the combined filtrates with aqueous sodium bicarbonate, drying and concentrating in vacuo the crude product was dissolved in methanol and potassium hydroxide (50 ml., 10 percent). After storage of the reaction mixture overnight at room temperature, the solvent was removed under vacuum, water added and the product isolated with ether and crystallized from acetone/hexane to afford 4α-fluoro-5α-trifluoromethoxyandrostan-3β,17β-diol, m.p. 190°–192°. On acetylation using acetic anhydride and pyridine at room temperature, this compound formed a crystalline diacetate, 4α-fluoro-5α-trifluoromethoxyandrostan-3β,17β-diol diacetate, m.p. 206°–207°.

Anal. Calcd. for $C_{24}H_{34}O_5F_4$: C, 60.30; H, 7.17: F, 15.90%. Found: C, 60.44; H, 7.33: F, 15.73%.

EXAMPLE 16

Reaction of Δ⁹⁽¹¹⁾-rockogenin with $CF_3OF$

Δ⁹⁽¹¹⁾-Rockogenin (2.0 g.) was dissolved in freon/methylene chloride (400 ml., 1:1) in the presence of CaO (800 mg.) and treatment with excess $CF_3OF$ (disappearance of starting material on t.l.c.) diluted with nitrogen at −78°. The reaction mixture was filtered into aq. $NaHCO_3$ (250 ml., 5 percent) and the products extracted with $CH_2Cl_2$ in the usual way. The total crude product was treated with MeOH (250 ml.) and $K_2CO_3$ (12 g.) in $H_2O$ (30 ml.) on a steam-bath for 30 min. After filtration, washing of the precipitate with methylene chloride, washing the combined filtrates with aqueous sodium bicarbonate, drying and concentrating in vacuo a mixture of products (2.19 9.) was obtained. This was chromatographed over neutral alumina (160 g., grade 3). The major fraction (1.183 g.), eluted with 30% $Et_2O/OH$, was 11α-fluoro-9α-trifluoromethoxy-5α, 25R-spirostan-3β,12β-diol (A). The analytical specimen obtained after four recrystallizations from $CH_2Cl_2/C_6H_{14}/Et_2O$ had m.p. 129°–133 °C; $[\alpha]_D^{CHCl_3}$ −51.8° (c = 3.92); I.R. $\nu_{max.}^{CHCl_3}$ 3700 (m), 3500 (w), 1725 (uw), 1650 (vw), 1260–1120 (s) cm.

Anal. $C_{28}H_{42}F_4O_5$: requires C, 62.91; H, 7.92; F, 14.22; O, 14.96%. Found: C, 63.08; H, 7.74; F, 14.44%.

The minor product (296 mg.) was 9α,11α-difluoro-5α,25R-spirostan-3β-12β-diol (B). Crystallization from $CH_2Cl_2$/hexane ultimately gave the analytical specimen, m.p. 232°–235°C.; $[\alpha]_D^{CHCl_3}$ −59.0° (c = 3.58); I.R. $\nu_{max.}^{KBr}$ 3500 (s) and 1640 (w) cm.⁻¹.

Anal. $C_{27}H_{42}F_2O_4$ requires: C, 69.20; H, 9.04; F, 8.11; O, 13.66%. Found: C, 69.04; H, 9.11; F, 8.01%.

A. (705 mg.) was dissolved in acetone (10 ml.) and titrated with Jones' reagent. The reaction mixture was poured onto ice/$H_2O$ (350 g.) and the solid product (664 mg.) filtered off. Crystallization from $CH_2Cl_2$/hexane gave pure 11α-fluoro-9α-trifluoromethoxy-5α,25R-spirostan-12β-ol-3-one(C). The analytical specimen had m.p. 199°–200°C.; $[\alpha]_D^{CHCl_3}$ −40.4° (c = 4.31); I.R. $\nu_{max.}^{KBr}$ 3500 (m), 1710 (s), 1240, 1190, 1140 (us) cm⁻¹.

Anal. $C_{28}H_{40}F_4O_5$ requires C, 63.15; H, 7.57; F, 14.27; O, 15.02%. Found: C, 63.27; H, 7.62; F, 14.09.

C. (300 mg.) was dissolved in acetone (60 ml.) and treated with Jones' reagent (3.0 ml.) at 5°C overnight. The usual work-up (vide supra) gave 179 mg. of crude product, crystallized from $CH_2Cl_2$/hexane to give 11α-fluoro-9α-trifluoromethoxy-5α,25R-spirostan-3,12-dione (D) (146 mg.). The analytical sample had m.p. 193°–195°C; $[\alpha]_C^{CHCl_3}$ −7.3° (c = 4.61); I.R. $\nu_{max}^{KBr}$ 1750(s), 1720 (s), 1250, 1190, 1160 (us) cm⁻¹.

Anal. $C_{28}H_{38}F_4O_5$ requires: C, 63.39; H, 7.22; F, 14.32; O, 15.02%. Found: C, 63.56; H, 6.82; F, 14.05%.

D. (50 mg.) was treated with MeOH (30 ml.) and KOAc (300 mg.) under reflux for 3½ hr. Removal of solvent and trituration with water gave 11-fluoro-5α,25R-spirost-9(11)-en-3,12-dione (48 mg.). Three crystallizations from $CH_2Cl_2$/hexane gave the analytical specimen, m.p. 256°–257°C, $[\alpha]^{CHCl_3}$−11.9° (c = 3.19); I.R. $_{max.}^{KBr}$ 1715 (s), 1685 (us), 1600 (w) cm⁻¹.

Anal. $C_{27}H_{37}FO_4$ requires C, 72.95; H, 8.39; F, 4.27; O, 14.40%. Found: C, 72.95; H, 8.47; F, 4.32%.

The 3,12-acetate of the 11α-hydroxy epimer of Δ⁹-(11)-rockogenin on reaction with $CF_3OF$ gave products analogous to and isomeric with A and B. The constitution of these products was determined by hydrolysis followed by oxidation to give the 3,12-diketones such as D.

All the products of this example are new compounds.

EXAMPLE 17

Fluorination of 2,6-dimethyl phenol

A solution of the title compound (0.53 g.) in dry freon (200 ml.) containing calcium oxide (1 g.) was treated with a molecular equivalent of $CF_3OF$ at −78°. The solution was filtered the precipitate was washed with methylene chloride and the combined filtrates were washed with aqueous sodium bicarbonate, dried, concentrated in vacuo and chromatographed on silica gel. Elution with chloroform/benzene gave the dimer of 2,6-dimethyl, 6-fluoro cyclo hexa, 2,4-dienone, melting point 181°–183°.

EXAMPLE 18

Fluorination of N-acetyl β-naphthylamine

A solution of the title compound (0.543 g.) in chloroform (100 ml.) and freon (100 ml.) containing calcium oxide (1 g.) was treated with a molecular proportion of $CF_3OF$ at −78°. After working up as in Example 1 the residue was recrystallized from ether/petroleum ether to give α-fluoro N-acetyl β-naphthylamine, melting point 120°–121°.

EXAMPLE 19

Fluorination of N-acetyl α-naphthylamine

A solution of the title compound (0.6 g.) in a mixture of freon (100 ml.) and chloroform (100 ml.) containing calcium oxide (1.1 g.) was treated at −78° with a molecular proportion of $CF_3OF$. After the working up as in Example 1 the residue was chromatographed on silica gel. Elution with chloroform and benzene gave 1-ethoxy, 1-acetamido, 2,4-difluoro, 3-trifluoro methoxy, tetrahydronaphthylamine, melting point 165°. Hydrolysis of this adduct with 5 percent sodium hydroxide in refluxing methanol lead to the elimination of the elements of ethanol and trifluoromethanol leading to N-acetyl, 1-amino, 2,4-difluoronaphthylamine, melting point 180°–182°.

EXAMPLE 20

Fluorination of Salicylic Acid

A solution of the title compound (0.6 g.) in a mixture of chloroform (100 ml.) and freon (150 ml.) containing calcium oxide (1.2 g.) was treated at 0° with a stream of $CF_3OF$ until starting material was no longer present (approximately 4 moles of hypofluorite were required). After working up as in Example 1 the residue was crystallized to give 5-fluoro salicylic acid. Fluorine nuclear magnetic resonance spectrum indicated that 5-fluoro and 3-fluoro salicylic acid were formed in the reaction in a proportion of approximately 4:1. Reaction of salicylamide under the same conditions afforded a mixture of 5-fluoro- and 3-fluoro salicylamide.

EXAMPLE 21

Fluorination of 2,3-benzofuran with $CF_3OF$

A solution of the title compound (2 g.) in freon (150 ml.) was treated with a slight excess of $CF_3OF$ in the presence of calcium oxide (0.5 g.) at −70°. After working up as in Example 1 the crude oil which comprised a major and minor product was dissolved and chromatographed on silica gel. The first and major product eluted from the column was 2-fluoro, 3-trifluoro methoxy, 2,3-dihydro benzofuran. Hydrolysis of this compound with sodium hydroxide in methanol gave 3-trifluoro methoxy benzofuran. The minor product from the reaction was 2,3-difluoro-2,3-dihydro benzofuran. Hydrolysis of this product as above gave 3-fluoro benzofuran.

EXAMPLE 22

Fluorination of pregna-4,9(11)-diene-3-one-17α,20,20,21-bismethylene-dioxide with $CF_3OF$ The title compound (1.93 g.) in a mixture of freon (288 ml.) and $CHCl_3$ (58 ml.) was treated with a molecular proportion of $CF_3OF$ at −78° in the presence of calcium oxide (500 mg.). After the usual work up the crude reaction product was partially purified by chromatography on aluminum oxide. Fractions containing the major product were further purified by thick layer chromatography to afford 19-nor-11α-fluoro-9α-methyl-pregna-1,3,5(10)-triene-3-ol-17 α,20,20,21-bismethylene-dioxide, melting point 109°–112° $[\alpha]_D$ −39.8°. The 3-acetate had melting point 147°–148°.

EXAMPLE 23

Reaction of trans-stilbene with $CF_3OF$

The title compound (0.5 g.) in chloroform (100 ml.) and freon (150 ml.) was treated with 2 molecular proportions of $CF_3OF$ at −78° in the presence of calcium oxide (0.5 g.). After the usual work up chromatography on silica gel afforded first 1,2-diphenyl-1-fluoro-2-trifluoromethoxy-ethane as a yellow oil (structure confirmed by N.M.R. and mass spectroscopy). Further elution afforded 1,2-difluoro-1,2-diphenyl-ethane, melting point 99°. Some fractions of the former compound were contaminated with traces 1,2-difluoro-1,2-diphenyl-1-trifluoromethoxy-ethane.

EXAMPLE 24

Fluorination of 11-oxo dexamethasone 1,3,5-triene-3-yl benzoate 17,20;20,21-bismethylene dioxide with $CF_3OF$ The title compound (500 mg. prepared by reaction of 11-oxo dexamethasone 17,20;20,21-bismethylene dioxide with trityl lithium followed by treatment with benzoic anhydride) dissolved in a mixture of freon (65 cc.) and methylene chloride (35 cc.) containing calcium oxide (200 mg.) was treated with $CF_3OF$ (1.2 equivalents) at −78° for 1 hour. After filtration washing of the precipitate with methylene chloride, washing the combined filtrates with aqueous sodium bicarbonate, drying and concentrating in vacuo treatment of the crude product mixture with methanol afforded 6β-fluoro dexamethasone 17,20;20,21-bismethylene dioxide (melting point 221°). λmax.MEOH methanol 233 mµ ($\epsilon$ = 16,400). The 1,3,5-triene-3-yl-benzoate of prednisone-17,20,20,21-bismethylene dioxide on reaction as above afforded 6β-fluoro prednisone-17,20,20,21-bismethylene dioxide.

EXAMPLE 25

Fluorination of naphthalene with $CF_3OF$

A solution of naphthalene (0.5 g.) in freon (200 cc.) containing calcium oxide (1 g.) was treated at −78° with $CF_3OF$ (2 moles). After filtration, washing of the precipitate with methylene chloride, washing the combined filtrates with aqueous sodium bicarbonate, drying and concentrating in vacuo, the crude product mixture was resolved by chromatography on alumina. The first product eluted was an adduct of naphthalene with 2 moles of $CF_3OF$ (melting point 73°). The second product eluted was an adduct formed by the addition of the elements of $CF_3OF$ to the 1,2-double bond and the elements of $F_2$ to the 3,4-double bond of naphthalene (melting point 96°–99°). The final product eluted was an adduct formed by the addition of the elements of $F_2$ to both the 1,2 and 3,4-double bonds of naphthalene, that is, 1,2,3,4-tetrafluoro 1,2,3,4-tetrahydro naphthalene (melting point 126°–128°). Treatment of any of these hydroaromatic products with potassium tertiary-butoxide in tertiary-butyl alcohol led to dehydro halogenation and the formation of the appropriate and expected fluorinated naphthalene derivatives.

EXAMPLE 26

Fluorination of griseofulvin with $CF_3OF$

A solution of griseofulvin (0.5 g.) in a mixture of chloroform (100 cc.) and freon (100 cc.) containing calcium oxide (1.0 g.) was treated with $CF_3OF$ (1 mole) and after filtration, washing of the precipitate with methylene chloride, washing the combined filtrates with aqueous sodium bicarbonate, drying and concentrating in vacuo the product mixture was resolved by thick layer chromatography (silica gel plates eluted with benzene/chloroform/acetone in a ratio of 50:50:1) and was found to be mostly a monofluorinated derivative together with smaller amounts of unreacted starting material. The monofluorinated product (a pale soluble liquid) was shown by N.M.R. spectroscopy to be the result of the replacement of the 5hydrogen of griseofulvin with a fluorine atom. A second and minor product was a difluorinated derivative, melting point 92°–94°, in which both the aromatic and enolic hydrogens had been replaced by fluorine atoms.

EXAMPLE 27

Fluorination of cis-stilbene with $CF_3OF$

The title compound when treated with $CF_3OF$ exactly as described for the trans-isomer in Example 23 gave analogous but isomeric products. Dehydrohalogenation experiments (potassium tertiary-butoxide in tertiary-butyl alcohol at room temperature for 3 days) indicated that the addition of $CF_3OF$ (and of $F_2$) to either isomer of stilbene proceeded in a cis fashion.

EXAMPLE 28

Fluorination of 3,4,6-tri-O-acetyl-D-glucal with $CF_3OF$

A solution of the title compound (1 g.) in freon (190 cc.) containing calcium oxide (500 mg.) was treated with $CF_3OF$ at −78°. After filtration, washing of the precipitate with methylene chloride, washing the combined filtrates with aqueous sodium bicarbonate, drying and concentrating in vacuo, a mixture of the isomeric forms of 2-fluoro, 2-desoxy-1-trifluoromethoxy-3,4,6-tri-o-acetyl-D-glucal and 1,2-difluoro-2-desoxy-3,4,6-tri-o-acetyl-D-glucal was obtained. The crude product mixture on reaction with boron-tri-fluoride in methanol afforded $\alpha$ and $\beta$-anomers of 2-desoxy-2-fluoro-3,4,6-tri-o-Acetyl-Methyl-D-glucoside.

EXAMPLE 29

Fluorination of bis-p-chloro-phenyl 2,2-dichloro ethylene with $CF_3OF$

A solution of the title compound (2.03 g.) in freon (200 cc.) maintained at −20° was treated with $CF_3OF$ (542 cc. added over 90 minutes). After a further 3.5 hours the reaction mixture was worked up by filtration washing of the precipitate with methylene chloride, washing the combined filtrates with aqueous sodium bicarbonate, drying and concentrating in vacuo and the crude product purified by chromatography on alumina to afford bis-para-chloro-phenyl 2,2-dichloro-2-fluoro-1-trifluoro methoxy ethane (melting point 52°–53°).

A minor product formed in the above reaction was bisparachlorophenyl-2,2-dichloro-1,2-difluoroethane, melting point 62°–63°.

EXAMPLE 30

Fluorination of 3,3-ethylenedioxy-5$\beta$-pregn-9$^{(11)}$-ene-17,20,20,21-bis-methylenedioxide-11-yl-benzoate with $CF_3OF$ A solution of the titled steroid (500 mg.) in a mixture of methylene chloride (75 cc.) and freon (75 cc.) containing calcium oxide (200 mg.) was treated at −78° with $CF_3OF$ until starting material was no longer in evidence (approximately 2 moles). After filtration washing of the precipitate with methylene chloride, washing the combined filtrates with aqueous sodium bicarbonate, drying and concentrating in vacuo the crude product which comprised a mixture of mono and difluorinated adducts together with the corresponding mono and difluorinated ketones was chromatographed on aluminum oxide. The first material eluted from the column was an adduct of the 9$\alpha$-monofluoro ketone and afforded the latter compound on hydrolysis.

EXAMPLE 31

Fluorination of N-acetyl Iminostilbene

A solution of the title compound (2.2 g.) in a mixture of chloroform (50 cc.) and $CFCl_3$ (150 cc.) was treated at −78° with 1.5 molecular equivalents of $CF_3OF$. Following the work-up procedure of Example 1 the product mixture was resolved to afford 2 isomers: melting point 100°–103° and melting point 100°–116°. In each of the isomers the elements of $CF_3OF$ had added across the central stilbene double bond. The isomerism apparently results from hindered rotation at the amide center.

EXAMPLE 32

Preparation and Purification of 2-fluoroxy-perfluoropropane (perfluoro iso-propyl hypofluorite)

Hexafluoro acetone (120 cc. measured as a gas at 760 millimeters of mercury at 279° Kelvin) was introduced into a reactor maintained at −78° and containing cesium fluoride (29.1 g.). Elemental fluorine was admitted to the reactor (80–85 cc. added in 4 to 5 portions over 40 minutes). The reaction vessel was cooled to −196° centigrade and evacuated to negligible pressure (this step was found to remove an extremely volatile but unreactive impurity and is usually unnecessary). The flask containing cesium fluoride and the crude hypofluorite was allowed to warm to room temperature and the contents were then distilled into an evacuated flask containing water (2 cc.). This flask was then cooled to −15° centigrade and the purified hypofluorite distilled into a reservoir at −196°. Material thus prepared and purified was adequate for the purposes of fluorination of organic compounds: such material was used for the fluorination of cholestenol acetate as described in Example 1. Reaction of this hypofluorite with several other substrates gave products similar to those obtained with $CF_3OF$, thus, for instance, prednisone 17,20,20,21-bismethylene dioxide on treatment with perfluoro-isopropyl hypofluorite afforded primarily 9$\alpha$-fluoro prednisone; $\Delta^{9(11)}$-hydro cortisone 17,20,20,21-bismethylene dioxide afforded largely the same phenol as obtained from reaction with $CF_3OF$. It appears that perfluoro isopropyl hypofluorite is unstable as fairly large excesses were necessary in order to lead the above reactions to completion.

EXAMPLE 33

Preparation of 2-fluoroxy-2-perfluoromethyl-perfluorobutane (perfluoro tertiary-amyl hypofluorite)

2-Hydroxy-2-perfluoromethyl-perfluorobutane (0.826 cc. density = 1.7 g. per cc.) was added to a mixture of cesium carbonate (630 mg.) and cesium fluoride (2.4 g.). This mixture was maintained at −78° while fluorine (32 cc.) was delivered in portions (if necessary at this stage it was possible to remove volatile but non reactive impurities be evacuation at −70°). The crude hypofluorite was then distilled into a flask containing water (2 cc.). After contact with the water at room temperature the purified hypofluorite was distilled at −15°C. into a storage reservoir held at low temperature. This tertiary hypofluorite had the expected infrared spectrum, liberated iodine from KI, and reacted with cholestenol acetate to afford 2α-fluoro cholestanone together with an adduct which on hydrolysis afforded the former compound.

EXAMPLE 34

Continuous preparation of $CF_3OF$ and its use as fluorinating agent

A monel reactor was charged with silver plated copper ribbon (approximately 0.01 g. silver per square centimeter of copper surface). The reactor was treated first at room temperature with fluorine diluted with nitrogen followed by undiluted fluorine. The temperature of the reactor was then raised slowly to 180° centigrade. Passage of fluorine was continued until the effluent gases gave a strongly positive test with starch iodide paper. This process serves to convert the silver deposited on the copper support to the argentic fluoride which serves as a catalyst.

A stream of carbon monoxide and a stream of fluorine diluted with nitrogen was passed into a reactor containing argentic fluoride supported on copper ribbon as described above. The temperature of the reactor was maintained from 160°–180° centigrade and the ratio of the feed gases was controlled so that the proportion of fluorine to carbon monoxide did not exceed 4:1. Furthermore, the gas flow to the reactor was adjusted so that no unreacted fluorine appeared in the effluent gases. The effluent gases were led via a passivated copper tube into the bottom of a polytetrafluoroethylene washing bottle which was charged with water and baffled with polytetrafluoroethylene turnings. Provision was made for the introduction of fresh water and the removal of the purified effluent gases at the top of the washing bottle. Provision was also made for the removal of water charged with HF and $CO_2$ from the bottom of the wash bottle. The purified gas stream containing $CF_3OF$ contaminated with bis-trifluoromethyl peroxide, tetrafluoromethane, $CO_2$, and mixed with nitrogen was led from the wash bottle first through a sodium fluoride trap then through a cold trap maintained at −20° to −80° centigrade. The effluent gas from the cold trap comprised largely $CF_3OF$ diluted with nitrogen. The rate of $CF_3OF$ production was estimated by observing the rate at which the purified gas stream liberated iodine from KI (the purification processes described above remove all impurities which react with KI in the absence of strong illumination). It was found that partially purified $CF_3OF$ prepared as described and estimated iodometrically was essentially equivalent to $CF_3OF$ which had been prepared in a conventional way and purified by fractional distillation to a purity of approximately 80 percent: thus, for example, partially purified $CF_3OF$ as described above reacted with cholestenol acetate as described in Example 1 to give after hydrolysis 2 α-fluoro cholestanone; with prednisone bismethylene dioxide enol benzoate as described in Example 22 to give after hydrolysis 9α-fluoro prednisone bismethylene dioxide; with bis-p-chloro-phenyl 2,2-dichloro-ethylene as described in Example 29 to give bis-p-chloro-phenyl-2,2-dichloro-2-fluoro-1-trifluoro methoxy ethane.

We claim:

1. A process for the electrophilic fluorination of an unsaturated steroid which comprises contacting the steroid in the liquid phase with a hypofluorite in which the fluoroxy group is covalently bonded to an inert electron attracting group.

2. A process as claimed in claim 1 in which the hypofluorite is fluoroalkyl hypofluorite or pentafluorosulphur hypofluorite.

3. A process as claimed in claim 1 in which the hypofluorite is trifluoromethyl hypofluorite.

4. A process as claimed in claim 1 in which the fluorination is effected at a temperature in the range 0° to −100°C.

5. A process as claimed in claim 1 in which the fluorination is carried out in the presence of a base.

6. A process as claimed in claim 1 in which the steroid is an 11-acyloxy-9,11-dehydrosteroid and the end product is a 9α-fluoro-11-keto steroid, in admixture with a 9,12-difluoro-11-keto-steroid.

7. A process as claimed in claim 1 in which the hypofluorite reagent is produced by reaction of elemental fluorine with an oxygenated carbon derivative, whereby substantially all of the fluorine enters into the reaction, followed by washing the initial products with an aqueous medium and removing the water from the washed products.

8. A process as claimed in claim 7 in which the oxygenated carbon derivative is selected from the group consisting of methanol, perfluoro-t-pentanol, perfluoro-t-butanol, carbonyl difluoride, perfluoroacetyl fluoride and hexafluoroacetone.

* * * * *

PO-1050
(5/69)

UNITED STATES PATENT OFFICE
CERTIFICATE OF CORRECTION

Patent No. 3,687,943          Dated August 29, 1972

Inventor(s) Derek H. R. Barton and Robert H. Hesse

It is certified that error appears in the above-identified patent and that said Letters Patent are hereby corrected as shown below:

On the title page, insert in [72] after the inventors names: --assignors to Research Institute for Medicine and Chemistry Inc., Cambridge, Mass.--

Column 24, insert the following claims after claim 8:

9. The process of claim 1 in which the steroid is a 17α-hydroxy-16-methylene steroid and the end product is a 16,17-epoxy-16-fluoromethyl steroid.

10. The process of claim 1 in which the steroid is a 3-alkoxy, 3-acyloxy or 3-dialkylamino steroid 3,5-diene.

11. The process of claim 10 in which the steroid has additionally a 1,2-double bond.

12. The process of claim 1 in which the hypofluorite is bisfluoroxy difluoro methane.

Signed and sealed this 3rd day of April 1973.

(SEAL)
Attest:

EDWARD M. FLETCHER, JR.          ROBERT GOTTSCHALK
Attesting Officer          Commissioner of Patents